United States Patent [19]

Raudat et al.

[11] 4,173,276
[45] Nov. 6, 1979

[54] APPARATUS FOR DETECTING AND CLEARING A JAM OF ARTICLES

[75] Inventors: John L. Raudat, North Madison; Lloyd D. Johnson, Portland, both of Conn.; Adam Z. Rydell, Decatur, Ga.

[73] Assignee: Standard-Knapp, Inc., Portland, Conn.

[21] Appl. No.: 742,968

[22] Filed: Nov. 17, 1976

[51] Int. Cl.² .............................................. B65G 47/26
[52] U.S. Cl. ...................................... 198/437; 198/444; 198/446; 198/502; 198/573
[58] Field of Search ............... 198/437, 444, 445, 446, 198/454, 456, 465, 466, 572, 573, 856, 502

[56] References Cited

U.S. PATENT DOCUMENTS

| | | | |
|---|---|---|---|
| 1,196,442 | 8/1916 | Eick .................. | 198/326 X |
| 1,755,720 | 4/1930 | Winkler et al. ........ | 198/445 |
| 2,065,205 | 12/1936 | Appleyard ............ | 198/30 |
| 2,315,880 | 4/1943 | Stiles ................ | 198/32 |
| 2,451,104 | 10/1948 | Lowe ................. | 198/30 |
| 2,615,555 | 10/1952 | Carter ............... | 198/30 |
| 2,731,128 | 1/1956 | Herold ............... | 198/30 |
| 2,788,882 | 4/1957 | Swartz ............... | 198/30 |
| 2,955,698 | 10/1960 | Packman et al. ....... | 198/445 |
| 2,998,118 | 8/1961 | Mencacci et al. ...... | 198/444 |
| 3,081,859 | 3/1963 | Meyer et al. ......... | 198/456 |
| 3,095,960 | 7/1963 | Luginbuhl ............ | 198/30 |
| 3,153,478 | 10/1964 | Meyer ................ | 198/573 |
| 3,165,871 | 1/1965 | Roth ................. | 53/247 |
| 3,240,314 | 3/1966 | Griner ............... | 198/446 |
| 3,310,151 | 3/1967 | Carter ............... | 198/444 |
| 3,465,868 | 9/1969 | Donner ............... | 198/444 |
| 3,595,374 | 7/1971 | Whitfield ............ | 198/856 |
| 3,613,860 | 10/1971 | Waite ................ | 198/30 |
| 3,628,647 | 12/1971 | Beard ................ | 198/454 |
| 3,707,216 | 12/1972 | Peres ................ | 198/30 |
| 3,710,918 | 1/1973 | Babunovic ............ | 198/30 |
| 3,749,227 | 7/1973 | Denherder ............ | 198/446 |
| 3,792,768 | 2/1974 | Cheeseman ............ | 198/445 |
| 3,830,359 | 8/1974 | Fogelberg ............ | 198/30 |
| 3,866,739 | 2/1975 | Korski ............... | 198/30 |
| 3,874,494 | 4/1975 | Temming ............. | 198/446 |

FOREIGN PATENT DOCUMENTS 1039387  8/1966  United Kingdom ............. 198/437

Primary Examiner—Richard A. Schacher
Attorney, Agent, or Firm—McCormick, Paulding & Huber

[57] ABSTRACT

An apparatus for detecting and clearing a jam of articles at the entrance to an article lane divider is provided which includes a plurality of parallel guides defining lanes for articles and conveyor means operative to advance articles toward the entrance to the lanes and to move the articles in the lanes. Detecting means are also included for detecting a jam of articles at the entrance to the lanes along with means for moving at least one of the parallel guides transversely to the direction of travel of the articles in response to the detection of a jam of articles at the entrance to the lanes by the detecting means, thereby breaking up the jam and permitting the articles to proceed into the lane divider.

21 Claims, 4 Drawing Figures

APPARATUS FOR DETECTING AND CLEARING A JAM OF ARTICLES

BACKGROUND OF THE INVENTION

1. Field of the Invention

This invention relates to an apparatus for detecting and clearing jams and particularly to an apparatus for detecting and clearing a jam of articles at the entrance to an article lane divider.

2. Description of the Prior Art

In the usual article packing line, articles such as bottles travel on a conveyor to an article lane divider where the articles to be packed are grouped within lanes for packing, such as for example, in a cardboard carton. The articles traveling on the conveyor frequently jam up at the entrance to the article lane divider, thereby resulting in a blocking condition which prevents articles from entering the lane divider and hence from being grouped for the packing machine. Ordinarily, the line must be shut down until the jam is cleared. Known lane dividers with jam clearing devices have not been entirely successful. For example, several known jam clearing devices rely on continuously oscillating members; see, for example, U.S. Pat. No. 2,998,118. Such an arrangement is undesirable because the normal flow of articles is interupted and slowed down by the continuously operating mechanism. Other systems rely on the machine operator to clear the jam. In such a case, the jam ordinarily goes unnoticed until the article packer ceases operation due to a lack of articles in the article lane divider (or grid).

SUMMARY OF THE INVENTION

The object of the present invention is the provision of an apparatus for detecting a jam of articles at the entrance to an article lane divider or the like, and to clear the jam itself, upon detection of a jam. The clearing action takes place only upon the detection of a jam.

Another object of the present invention is the provision of an apparatus for detecting a jam of articles at the entrance to an article lane divider or the like, and to clear the jam itself without machine operator assistance.

In accordance with the present invention, an apparatus for detecting and clearing a jam of articles at the entrance to an article lane divider, or the like, is provided by the combination of a plurality of parallel guides defining lanes for articles, conveyor means operative to move articles in said lanes, delivery means operative to advance articles toward the entrance to the lanes (the same conveyor may be utilized to move the articles to the lanes and to move them in the lanes), detecting means for detecting a jam of articles at the entrance to the lanes, and means for moving at least one of the parallel guides transversely to the direction of travel of the articles in response to the detection of a jam of articles at the entrance to the lanes by the detecting means.

In accordance with another aspect of the present invention, outside wall means are disposed upstream of the entrance to said lanes having movable portions movable at least proximate the entrance to the lanes, and means for moving both of the movable portions are provided to move both movable wall portions in response to the detection of a jam.

The foregoing and other objects, features and advantages of the present invention will become more apparent in light of the following detailed description of a preferred embodiment thereof as illustrated in the accompanying drawings.

DESCRIPTION OF THE PREFERRED EMBODIMENT

Figure 1:
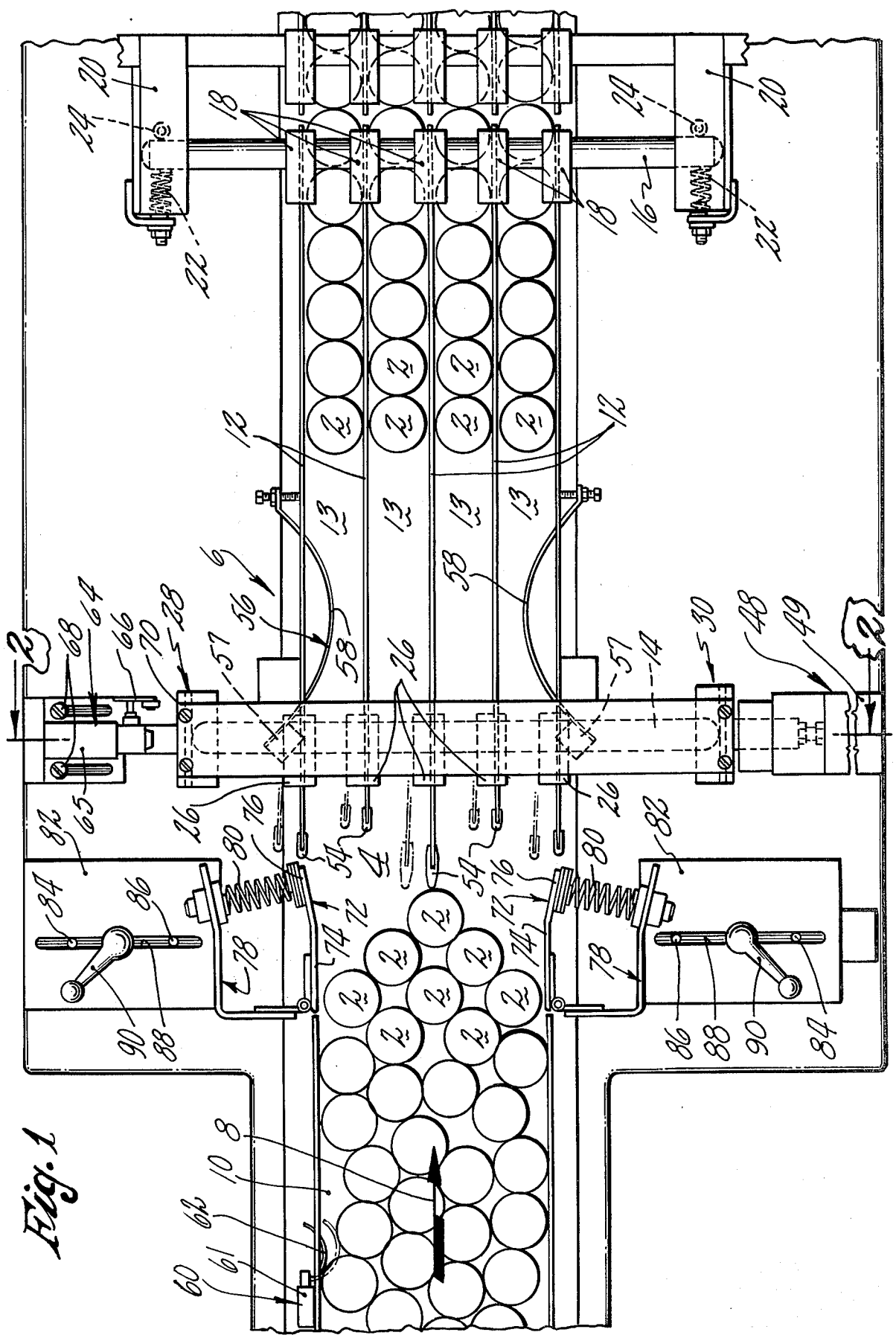
FIG. 1 is a plan view of an apparatus for detecting and clearing a jam of articles at the entrance to an article lane divider in accordance with the present invention.

Referring to the drawings, and more particularly FIG. 1, there is shown an apparatus for detecting and clearing a jam of articles 2 at the entrance 4 to an article lane divider 6 in accordance with one embodiment of the present invention. The articles 2, which may be of any shape or type, such as bottles, cases, or packages, proceed in the direction indicated by arrow 8 to the entrance 4 to the article lane divider 6 on a suitable conveyor mechanism 10.

The article lane divider 6 has a plurality of parallel divider separating guides 12 defining lanes 13 therebetween for the articles 2. The articles 2 may be moved in the lanes 13 by the conveyor 10 or a separate conveyor may be provided. As shown in FIG. 1, the divider separating guides 12 may be suspended over the conveyor 10 by means of spaced rods 14 and 16. Each of the divider separating guides 12, at a point adjacent their downstream end, is attached to a collar 18, which in turn is fixedly mounted on the rod 16. Each end of the rod 16 is resiliently held in a bracket 20 between a spring 22 and a pivot 24. The rod 16 is thus able to pivot about either one of the pivots 24 against the force of the spring 22 at the opposite end of the rod 16. At a point adjacent the upstream end of the divider separating guides 12, each of the guides 12 is attached to a collar 26 which in turn is fixedly mounted on the rod 14 for movement therewith.

Two rod supporting members 28 and 30 may be provided for supporting the rod 14. Each of the rod supporting members 28 and 30 include an enlarged portion 32 and a reduced elongated rod portion 34 extending therefrom. The enlarged portion 32 has an aperture 36 therein on its side opposite the rod portion 34 in which an end of the rod 14 may be mounted.

The rod portion 34 of rod supporting member 28 is slidably mounted for axial movement in a bearing 38 which in turn is mounted in a bracket 40 attached to the frame of the apparatus. The rod portion 34 of the rod supporting member is similarly mounted for axial movement in a bearing 42 mounted in a bracket 44 attached to the frame of the apparatus. The two rod supporting members 28 and 30 are interconnected by a strip member 46 extending parallel to rod 14 and attached at each end to one of the rod supporting members 28 and 30.

A rod driving mechanism 48 for reciprocally driving the rod 14 in an axial direction is mounted on the bracket 44. According to the preferred form, the rod driving mechanism 48 may be a spring return air cylinder 49 having a piston member which is either attached to or integral with the rod portion 34 of the rod supporting member 30. An appropriate air supply line 50 connected to a source of pressurized air (not shown) is provided to supply air to the interior of the cylinder. An on-off control valve 52 is mounted in the air supply line 50 to control the air flow to the cylinder 49. Preferably, this valve is a solenoid actuated valve. Actuation of the rod driving mechanism 48 moves the rod 14 in an axial direction thereby moving the upstream portion of the divider separating guides 12 transversely to the direction of travel of the articles 2.

The upstream end of each of the divider separating guides 12 may be provided with a bumper 54 fabricated from plastic or other suitable material. The bumpers 54 may each have a rounded or tapered leading edge to help deflect the articles 2 to either side of the divider separating guide 12. Alternatively, the leading end of any of the divider separating guides 12 may be provided with rollers having their axis extending in a vertical direction, in place of bumpers 54.

As shown in FIG. 1, jam detectors 56 may be provided downstream of the entrance 4 to the article lane divider 6 to detect the presence or absence of articles 2 in the lanes 13. Although a jam detector 56 may be associated with any number of the lanes 13, it is preferred that a jam detector 56 be provided in association with only the two outside lanes. Each jam detector 56 may be a limit switch 57 having an actuator arm 58 extending into the path of travel of the articles 2 in the associated lane 13 a suitable distance to be actuated by the passage of an article 2. The switch 57 is of the normally closed type so that the switch 57 will be open during passage of articles 2 down the lane, and closed during the time no articles 2 are passing down the lane and the actuator arm 58 is not actuated by an article 2.

A low level detector 60 may be provided upstream of the entrance 4 to the article lane divider 6 to detect the presence or absence of a sufficient number of incoming articles 2 to satisfy the requirements for the operation taking place downstream of the article lane divider 6. Although two low level detectors 60 may be provided oppositely disposed on either side of the path of travel of the articles 2, it has been found that the use of one detector 60 is usually sufficient. The low level detector 60 may be a limit switch 61 having an actuator arm 62 extending a sufficient distance into the path of the articles 2 to be actuated when contacted by an article 2 passing by. The switch 61 is of the normally open type so that the switch 61 will be open when there is an insufficient number of articles passing by to activate the actuator arm 62. The switch 61 will be closed when a sufficient number of articles passes thereby to actuate the actuator arm 62.

A rod return actuator 64 is mounted on the bracket 40 and serves to cause the rod driving mechanism 48 to return the rod 14 to its original position when actuated. The rod return actuator 64 may be a time delayed limit switch 65 having an actuator arm 66 positioned in the path of travel of the rod supporting member 28. The limit switch 65 is preferably of the normally closed type which will open upon actuator arm 66 being actuated. The time delay serves to maintain the switch 65 in its open position for a predetermined period of time after the actuator arm 66 is released and returns to its normal position. Preferably, this time delay is about two seconds. Activation of the actuator arm 66 and the opening of switch 65 causes the rod 14 to return to its original position. The rod return actuator 64 is adjustable in a direction parallel to the axis of rod 14 by loosening the screws 68. Thus, the length of axial movement of the rod 14 may be adjusted by adjusting the distance between the actuator arm 66 and the outer face 70 of the enlarged portion 32 of rod support member 34.

As shown in FIG. 1, a set of oppositely disposed spring loaded side plates 72 are provided adjacent the entrance 4 to the article lane divider 6 to relieve pressure that might build up at entrance 6 due to a jam of the articles 2. Each side plate 72 includes an upstream portion 74 which is normally parallel to the direction of movement of the conveyor 10 and a downstream portion 76 which flares outwardly from the upstream portion 74. The upstream portion 74 is hingedly connected to one leg of a generally L-shaped mounted bracket 78. A suitable compression spring 80 extends between the other leg of the bracket 78 and the downstream portion 76 of the side plate 72. The mounting bracket 78 is attached to a plate member 82 which is adjustable in a direction perpendicular to the direction of movement of the conveyor 10, by means of spaced pins 84 and 86 attached to the frame of the apparatus and which extend into an elongated slot 88 in the plate member 82 and a locking handle 90. Each side plate 72 will pivot outwardly against the force of the spring 80 to relieve pressure on the articles 2 when a jam occurs.

Figure 3:
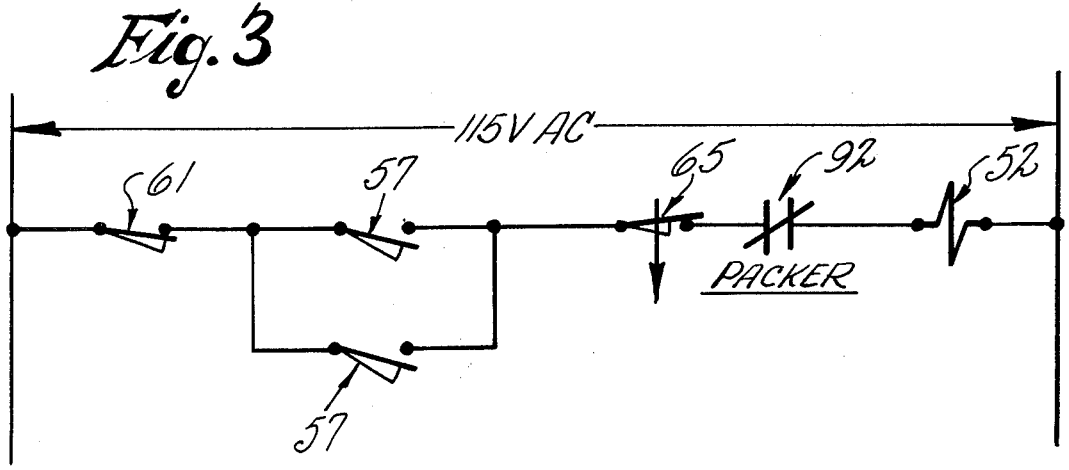
FIG. 3 is an electrical schematic showing the controls for the apparatus.

A typical electrical circuit for use with the present invention is shown in FIG. 3. The circuit includes the limit switch 61 electrically connected in series to the limit switches 57 which are in parallel with one another. The time delayed limit switch 65 is connected in series with the limit switch 61 and limit switches 57. Also connected in series is the solenoid valve 52. If desired, a circuit breaker 92, such as a relay or the like, which opens when the motor of the downstream apparatus such as a packer or the like is turned off. The circuit is connected to a suitable voltage source such as 115 volt alternating current.

In operation, with the conveyor 10 moving in the direction of arrow 8, and the articles 2 being fed properly into the article lane divider 6 and moving down the lanes, the limit switch 61 (low level detector 60) will be closed, both limit switches 57 (jam detectors 56) will be activated and therefor open, the time delayed limit switch 65 (rod return actuator 64) will be unactivated and closed, and the circuit breaker 92 closed due to the operation of the motor of the downstream packer or other apparatus. Thus, the electrical circuit shown in FIG. 3 is open and no current will flow. In addition, under normal operating conditions, the solenoid valve 52 is off and the rod 14 is in its rest position whereby the divider separating guides extend generally parallel to the direction of movement of the conveyor.

Figure 2:
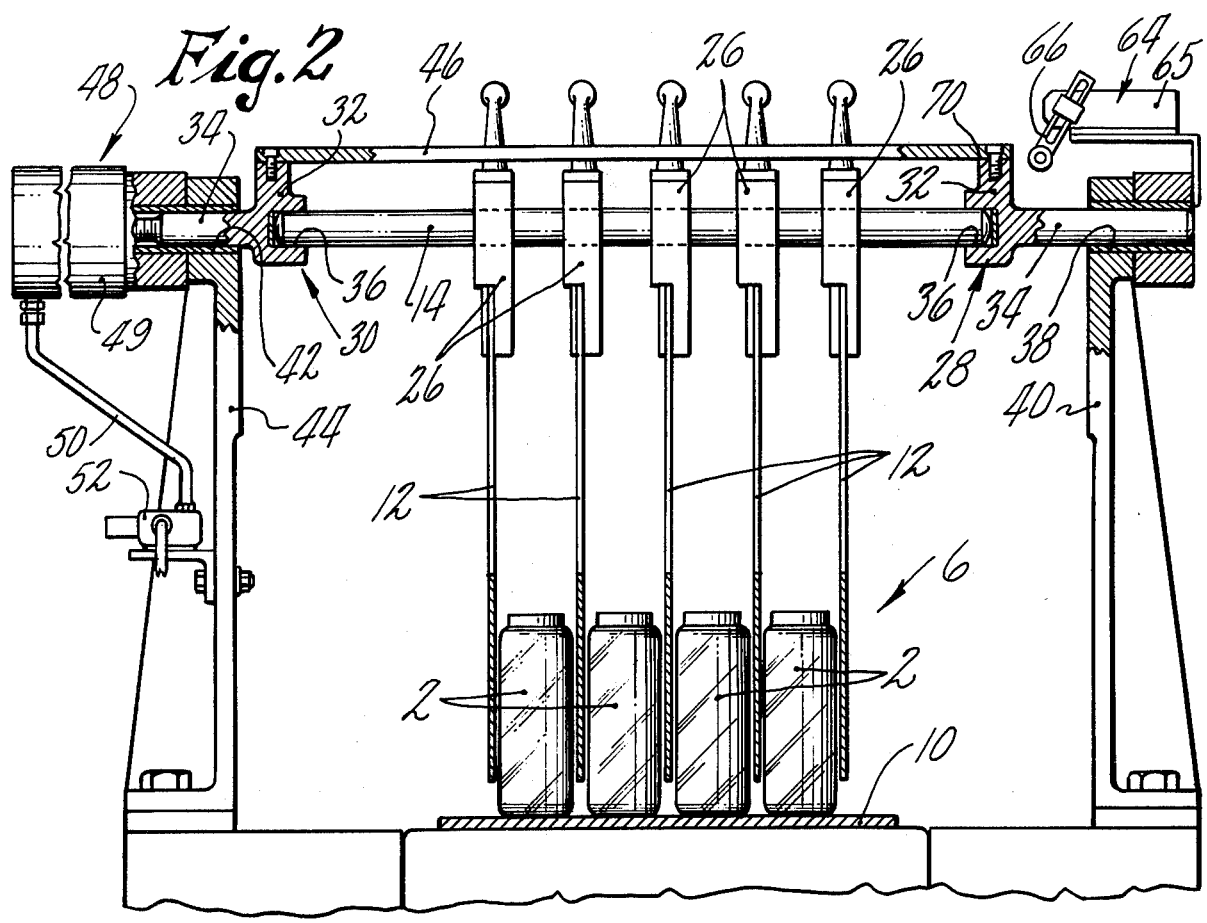
FIG. 2 is a sectioned elevation view taken along line 2—2 of FIG. 1.

If a jam occurs at the entrance 4 of the article lane divider 6 whereby the articles 2 are prevented from entering the lane divider 6, the limit switches 57 (jam detector 56) will sense a void of articles and close after the last of the articles 2 which has entered the article lane divider 6 before the jam occurred has passed by. Closing of either one of the limit switches 57 completes the electrical circuit of FIG. 3 whereby current flows to the solenoid valve 52 causing the opening thereof. With the valve 52 open, compressed air will flow to the air cylinder 49 causing the piston therein, and the rod support member 30, rod 14 and rod support member 28, to move toward the rod return actuator 64. This movement of the rod 14 causes the upstream end of the divider separating guides 12 to move transversely to the direction of movement of the conveyor 10 into the position indicated by the dotted lines in FIG. 1. The rod 16, supporting the downstream ends of the divider separating guides 12 will pivot about the upper pivot 24 (as viewed in FIG. 2) against the force of the lower spring 22.

The piston in the air cylinder 49 continues to move until the outer face 70 of the rod support member 34 actuates the actuator arm 66 causing the opening of the time delayed limit switch 65. Opening of the time delayed limit switch 65 breaks the electrical circuit shown in FIG. 3 and the solenoid valve 52 is deenergized. Deenergization of the valve 52 causes the closing of the valve 52, closing off the air supply to the cylinder 49 permitting the air to exhaust therefrom in any suitable manner, and the piston to return to its original position under the force of the return spring. Return of the piston results in the divider separating guides 12 being returned to their original position.

After the time delayed limit switch 65 has been opened as described above, it will remain open for a predetermined period of time even though the rod 14 has returned to its original position. If, before the time delayed limit switch 65 closes, the jam has been cleared, and the articles 2 begin to flow down the lanes 13 and actuate the actuator arms 58 of both limit switches 57, the limit switches 57 will open, opening the electrical circuit. In this event, the closing of the time delayed switch 65 will have no effect on the circuit. On the other hand, if the jam is not cleared, and the limit switches 57 are still closed when the time delayed limit switch 65 closes, the closure of the limit switch 65 will complete the electrical circuit. In this case, the valve 52 will be energized due to current flowing in the closed electrical circuit permitting air to again flow to the cylinder 49 resulting in the rod 14 moving toward the rod return actuator 64 and the upstream end of the divider separating guides 12 again being moved transversely to the direction of movement of the conveyor 10. The rod 14 will be moved until it actuates the actuator arm 66 of the time delayed limit switch 65 which opens causing the return of the rod 14 to its original position. This cycle will continue until the jam is cleared and the limit switches 57 are actuated by the presence of articles 2 and thusly opened when the time delayed limit switch 65 closes. The provision of the low level jam detector 60 prevents divider separating guides 12 from oscillating in the event there is either no articles 2 or an insufficient number of articles being conveyed to cause the actuation of the actuator arms 58 of the limit switches 57. This is accomplished by virtue of the fact that if the actuator arm 62 of the limit switch 61 is not actuated by the presence of articles, the switch 61 will be open, preventing the closing of the electrical circuit of FIG. 3, even though the limit switches 57 may be closed. This will prevent unnecessary movement of the divider separating guides 12. This feature is especially advantageous because it results in an automatic shutdown of the divider separating guide driving mechanism at the end of a run when all articles have passed by the jam detectors 57.

The inclusion of the circuit breaker 92 in the electrical circuit of FIG. 3 prevents the divider separating guides 12 from being moved unless the motor of the downstream apparatus such as a packer is turned on and the apparatus operating. With the apparatus motor off, the circuit breaker 92 is open, prohibiting either limit switch 61 or limit switches 57 from closing the circuit. If desired, the drive for the conveyor 10 may be actuated with the motor of the downstream apparatus, at least to the extent that when the motor of the downstream apparatus is turned off, the conveyor will shutdown and the circuit breaker 92 will open.

Figure 4:
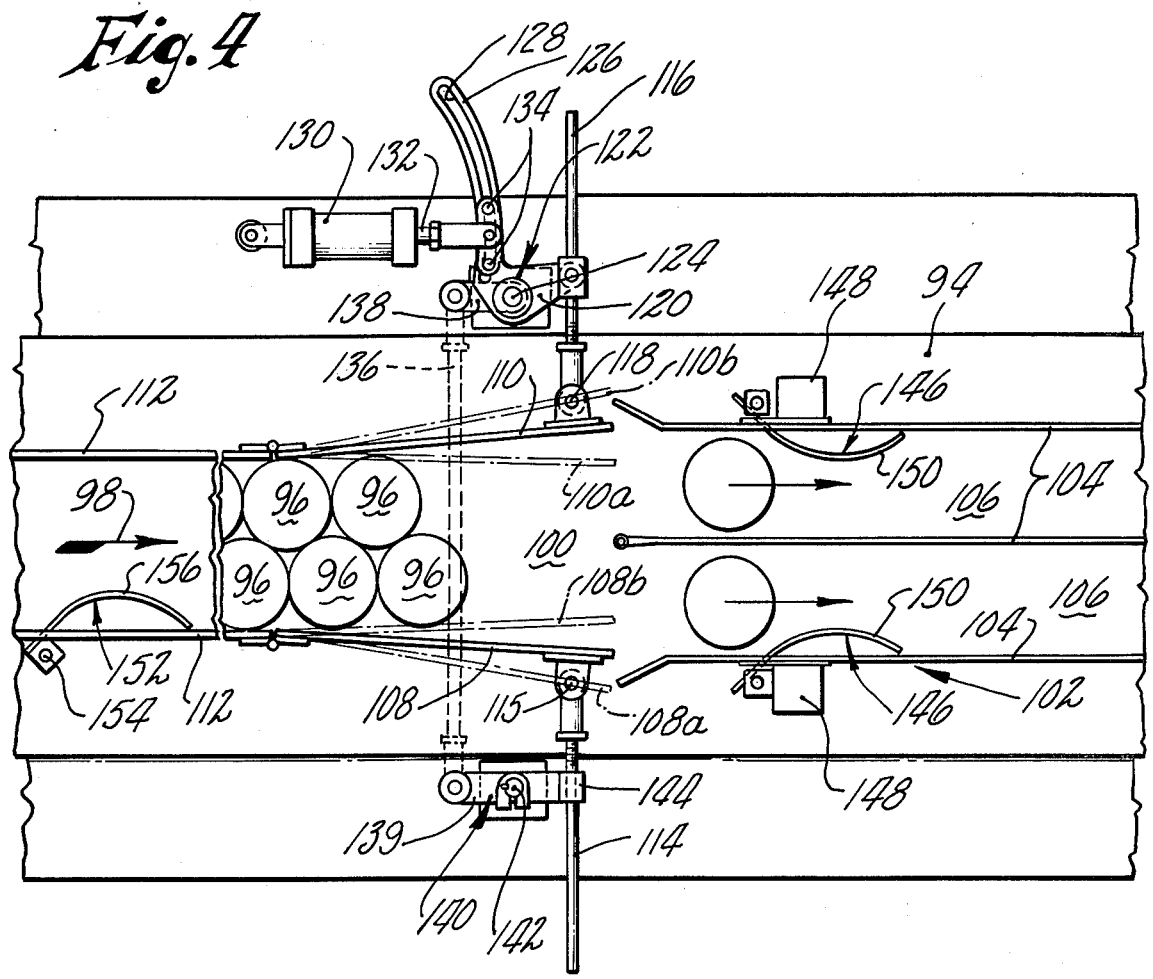
FIG. 4 is a partial plan view of another embodiment of an apparatus for detecting and clearing a jam of articles at the entrance to an article lane divider according to the present invention.

A second embodiment of the invention is shown in FIG. 4 wherein a conveyor 94 is used to transport the articles 96 in the direction of the arrow 98 to the entrance 100 of an article lane divider 102. The article lane divider 102 includes a plurality of parallel divider separating guides 104 which define lanes 106 therebetween for the articles 96. The articles 96 may be moved in the lanes 106 by the conveyor 94 or by a separate conveyor if desired. The divided separating guides 102 are suspended over the conveyor 94 and are mounted on the apparatus in any suitable manner.

Two oppositely disposed movable side plates 108 and 110 are provided immediately upstream of the leading edge of the divider separating guides 102. Each of the side plates 108 and 110 is hingedly connected at its upstream end to a side rail 112. In the normal position of the side plates 108 and 110, they flare outwardly to align with the two outer divider separating guides 104. A rod member 114 is pivotally attached to the side plate 108 by pivot pin 115. A similar rod member 116 is attached to side plate 110 by a pivot pin 118.

The rod member 116 is pivotally attached to one arm 120 of a three arm rocking beam 122. The rocking beam 122 is pivotally mounted on a pivot pin 124. The second arm 126 of the rocking beam 122 includes an arcuate slot 128. A dual acting air cylinder 130 is provided having a piston member 132 which is connected to the second arm 126 by pins 134 which extend into the arcuate slot 128. An elongated rod 136 has one end pivotally attached to the third arm 138 of the rocking beam 122 and extends under the conveyor 94. The other end of the rod 136 is pivotally attached to one arm 139 of a rocker arm 140 which is pivotally mounted on pivot pin 142. The other arm 144 is attached to the rod member 114.

By virtue of the mechanism described above and as shown in FIG. 4 it will be noted that upon movement of the piston member 132 outward from its rest position, the side plates 108 and 110 will pivot about their hinged connection such that the downstream ends thereof will move in unison transversely to the direction of the movement of the conveyor 94 into the position indicated by dotted lines 108a and 110a. Movement of the piston member 132 inwardly in the air cylinder 130 from its rest position will move the side plates 108 and 110 in unison to the position indicated by the dotted lines 108b and 110b.

A set of jam detectors 146 is provided downstream of the entrance 100 of an article lane divider 102. As in the case of the previously described embodiment, the jam detector 146 may comprise a limit switch 148 having an actuator arm 150 extending into the path of the articles 96. Each limit switch 148 is of the type that is normally closed when the actuator arms are not actuated by the passage of articles.

A low level detector 152 is provided upstream of the side plates 108 and 110. The low level detector 152 is preferably a limit switch 154 having an actuator arm 156 extending into the path of the articles 96 in a position to be actuated thereby. The switch 154 is of the type that is normally open when the actuator arm 156 is not actuated.

A suitable electrical circuit (not shown) using standard electrical components and incorporating the switches 148 and 150 is used to control a suitable valve mechanism (not shown) for moving the piston member 132. In operation, if the low level detector 152 is actuated by the presence of articles 96 and the jam detectors 146 sense the void of articles 96 whereby either of the switches 154 are closed this will indicate a jam at the leading edges of the divider separating guides 104. This condition will cause the valve mechanism to open and actuate the piston member 132 in the air cylinder 130 causing it to move outwardly, moving the side plates into their position shown by the dotted lines 108a and 110a. A suitable timer may be provided to hold the side plates 108 and 110 in this position. A second timer of any conventional type may be provided in the electrical circuit so that the valve mechanism will be actuated to move the piston member 132 rearwardly, past its rest position to move the side plates 108 and 110 into the position indicated by dotted lines 108b and 110b if the jam detectors 146 have not been actuated by the passage of articles before the expiration of the time period controlled by the second timer. If, however, the jam detectors 146 detect the passage of articles and limit switches 148 are opened, the piston member 132 will return to its rest position when the first timer times out. Until the jam detectors 146 detect the presence of articles, the timers serve to oscillate the side plates 108 and 110 between the position indicated by dotted lines 108a and 110a and the position indicated by the dotted lines 108b and 110b. The low level detector 152 serves to prevent actuation of the air cylinder 130 if no articles are present to activate the actuator arm 156.

By virtue of the above described apparatus, in accordance with both embodiments, a jam of articles may be detected and the jam cleared in response to the detection thereof. The jam is cleared by moving either the divider separating guides or side plates transversely to the normal flow of the articles.

What is claimed is:

1. An apparatus for detecting and clearing a jam of articles at the entrance to an article lane divider, comprising:
   (a) a plurality of parallel guides defining lanes for articles;
   (b) conveyor means operative to advance articles toward the entrance to said lanes and to move articles in said lanes;
   (c) detecting means for detecting a jam of articles at the entrance to said lanes; and
   (d) means for moving at least one of said parallel guides transversely to the direction of travel of the articles in response to said detecting means detecting a jam of articles at the entrance to said lanes.

2. An apparatus for detecting and clearing a jam of articles at the entrance to an article lane divider, comprising:
   (a) a plurality of parallel guides defining lanes for articles, said guides having first ends terminating at the entrance to the lane divider;
   (b) conveyor means operative to advance articles toward the entrance to said lanes and to move articles in said lanes;
   (c) detecting means for detecting a jam of articles at the entrance to said lanes; and
   (d) means for moving at least one of said first ends of said parallel guides transversely to the direction of travel of the articles in response to said detecting means detecting a jam of articles at the entrance to said lanes.

3. The apparatus for detecting and clearing a jam of articles at the entrance to an article lane divider as defined in claim 2, wherein the means for moving at least one of said first ends of said parallel guides moves all of said first ends of said parallel guides simultaneously.

4. The apparatus for detecting and clearing a jam of articles at the entrance to an article lane divider as defined in claim 2, wherein said parallel guides have second ends resiliently disposed downstream of said first ends.

5. The apparatus for detecting and clearing a jam of articles at the entrance to an article lane divider as defined in claim 2 wherein said detecting means includes means for detecting the absence of articles downstream of the entrance to said lanes.

6. The apparatus for detecting and clearing a jam of articles at the entrance to an article lane divider as defined in claim 5, further including sensing means for detecting the absence of articles upstream of said entrance to said lane divider, and means for rendering inoperative the means for moving at least one of said first ends in response to said sensing means detecting the absence of articles upstream of the entrance to said lanes.

7. The apparatus for detecting and clearing a jam of articles at the entrance to an article lane divider as defined in claim 2 further including spring biased side plates defining the lateral path of the articles, said side plates being positioned upstream of said first end of said guides and being movable outwardly against the spring bias under force of an article moving laterally of the conveyer.

8. The apparatus for detecting and clearing a jam of articles at the entrance to an article lane divider as defined in claim 3, wherein said detecting means includes at least one jam detecting limit switch having an actuator arm extending into the path of the articles in one of said lanes downstream of said entrance, said limit switch being closed when the actuator arm is not actuated.

9. The apparatus for detecting and clearing a jam of articles at the entrance to an article lane divider as defined in claim 8, wherein said means for moving at least one of said first ends includes support means for supporting at least one of said first ends, moving means for moving said support means transversely of the direction of travel of said articles, and return means for limiting the extent of travel of said support means and returning said support means to its original position.

10. The apparatus for detecting and clearing a jam of articles at the entrance to an article lane divider as defined in claim 9, wherein said return means includes a time delayed limit switch having an actuator arm for contact by said support means, said limit switch being normally open, said return means operable to return said support means to its original position when said actuator arm of said time delayed limit switch is actuated by said support means.

11. The apparatus for detecting and clearing a jam of articles at the entrance to an article lane divider as defined in claim 10, wherein said time delayed limit switch prevents said means for moving one of said first ends from moving said one of said first ends for a predetermined period of time after said one of said first ends has been moved and returned even though said jam detecting limit switch is not actuated.

12. The apparatus for detecting and clearing a jam of articles at the entrance to an article lane divider as defined in claim 11, wherein said moving means includes a spring return air cylinder having a piston connected to said support means and an electrical on-off valve for controlling the air supply to the cylinder, said jam detector limit switch causing the opening of said valve when said switch is closed, and said time delay limit switch causing the closing of said valve when said switch is opened.

13. The apparatus for detecting and clearing a jam of articles at the entrance to an article lane divider as defined in claim 12, further including sensing means for detecting the absence of articles upstream of said entrance to said lane divider, and means for rendering inoperative the moving means in response to said sensing means detecting the absence of articles upstream of the entrance to said lanes.

14. The apparatus for detecting and clearing a jam of articles at the entrance to an article lane divider as defined in claim 13, wherein said sensing means includes an upstream limit switch having an actuator arm extending into the path of articles, said upstream limit switch being open when the actuator arm is not actuated.

15. Apparatus for detecting and clearing a jam of articles at the entrance to an article lane divider, comprising:
 (a) a plurality of parallel guides defining lanes for articles;
 (b) conveyor means to advance articles toward the entrance to said lanes and to move articles in said lanes;
 (c) outside wall means disposed upstream of the entrance to said lanes having two oppositely disposed movable portions movable at least proximate the entrance to said lanes;
 (d) detecting means for detecting a jam of articles at the entrance to said lanes; and
 (e) means for moving both said movable portions of said outside wall means transversely to the direction of travel of the articles in response to said detecting means detecting a jam of articles at the entrance to said lanes.

16. The apparatus of claim 15 wherein said outside wall means includes a set of oppositely disposed movable portions, and said means for moving includes means interconnecting said oppositely disposed movable portions for moving said movable portions in unison.

17. The apparatus of claim 15 wherein said detecting means includes means for detecting absence of articles downstream of the entrance to the lane divider.

18. The apparatus of claim 17 wherein said detecting means includes a limit switch having an actuator arm extending into the path of articles downstream of the entrance to said lane divider, said limit switch being closed when said actuator arm is not actuated.

19. The apparatus of claim 17 further including sensing means detecting the absence of articles upstream of said movable portions, said sensing means operable to render said means for moving inoperative when said sensing means senses the absence of articles.

20. The apparatus of claim 19 wherein said sensing means includes a limit switch having an actuator arm extending into the path of articles upstream of said movable portions, said limit switch being open when said actuator arm is not actuated.

21. An apparatus for detecting and clearing a jam of articles at the entrance to an article lane divider, comprising:
 (a) a plurality of parallel guides defining lanes for articles;
 (b) conveyor means operative to advance articles toward the entrance to said lanes and to move said articles in said lanes;
 (c) detecting means for detecting a jam of articles at the entrance to said lanes;
 (d) means for oscillating at least one of said parallel guides in a direction transverse to the direction of travel of said articles in response to said detecting means detecting a jam of articles at the entrance to said lanes; and
 (e) means for stopping the oscillation of said at least one parallel guide for a predetermined period of time after one oscillation and causing a second oscillation if said detecting means still detects a jam after the passage of said predetermined period of time.

* * * * *